United States Patent
Lavine et al.

(10) Patent No.: US 8,103,314 B1
(45) Date of Patent: Jan. 24, 2012

(54) USER GENERATED RINGTONES

(75) Inventors: Adam Lavine, Livermore, CA (US);
Yu-Jen Dennis Chen, Livermore, CA (US); Hudson A. George, Benicia, CA (US); Brad Peralta, Hayward, CA (US); Kai Yung, Livermore, CA (US); Daniel Marius Lyon, San Francisco, CA (US); Shaheen Hamid Parkar, Dublin, CA (US)

(73) Assignee: Funmobility, Inc., Pleasanton, CA (US)

( * ) Notice: Subject to any disclaimer, the term of this patent is extended or adjusted under 35 U.S.C. 154(b) by 421 days.

(21) Appl. No.: 12/466,886

(22) Filed: May 15, 2009

Related U.S. Application Data

(60) Provisional application No. 61/053,508, filed on May 15, 2008.

(51) Int. Cl.
*H04M 1/00* (2006.01)

(52) U.S. Cl. .................................................... 455/567
(58) Field of Classification Search ..................... None
See application file for complete search history.

(56) References Cited

U.S. PATENT DOCUMENTS

| | | | |
|---|---|---|---|
| 2003/0159566 A1* | 8/2003 | Sater et al. ....................... | 84/615 |
| 2006/0028951 A1* | 2/2006 | Tozun et al. ..................... | 369/84 |
| 2006/0136556 A1* | 6/2006 | Stevens et al. ................. | 709/203 |

* cited by examiner

*Primary Examiner* — Anh Tran
(74) *Attorney, Agent, or Firm* — Maschoff Gilmore & Israelsen

(57) ABSTRACT

Systems and methods for creating a mixed ringtone for a personal device. A user accesses a server, including a template selector and selects a template into which a user-created recording may be mixed. The user then records a recording, which is used by the server in association with the selected template to produce a mixed ringtone. The mixed ringtone is then formatted for the user's device and transmitted to the user's device.

20 Claims, 3 Drawing Sheets

USER GENERATED RINGTONES

CROSS-REFERENCE TO RELATED APPLICATION

This application claims priority to U.S. Provisional Patent Application Ser. No. 61/053,508, filed on May 15, 2008, which is incorporated herein by reference in its entirety.

BACKGROUND OF THE INVENTION

1. The Field of the Invention

The invention generally relates to creating customized content for wireless devices. More specifically, embodiments of the invention relate to systems and methods for mixing a recording of a user generated recording into a musical track in order to create a customized ringtone for a mobile telephone.

2. The Relevant Technology

In relatively few years, cellular telephones have gone from being rare, expensive pieces of equipment used mainly by businesses to inexpensive, commonly owned personal devices. Cellular telephones have become an integral part of people's lives, and have even replaced the use of traditional land-line telephones in many homes throughout the world.

Along with the growth in use and popularity of cellular phones, a mobile culture has evolved and cellular phones are now widely used as social tools. Friends stay in touch using personalized phone address books, SMS text-messaging features, and email retrieval. The phone itself has become its own fashion object, with users personalizing, decorating, and customizing their phones to reflect their own personality or for other reasons.

Currently, users have several options to customize their phones. Decorative covers are widely available and can be easily changed. Cellular phones also offer users the ability to create custom settings. For example, many phones contain a memory bound listing of different ringtone selections, typically consisting of popular tunes, classical scores, or traditional telephone rings. While this listing generally offers a cellular phone user a degree of customization, the personalization is often limited to the number of selections preloaded in memory.

As users have sought additional ringtone choices beyond those available in the default phone settings, several options have become available. One option permits a user to download a desired ringtone from a large selection, typically available via the Internet. Generally, the user selects a previously created ringtone from a listing of available tones, often pays a fee for access to the new ringtone, and finally receives a SMS message which contains the ringtone of choice.

Despite these advances, however, users are generally still limited to selecting from a pre-fabricated library of ringtones. Generally, these ringtones are created by someone other than the user and prevent the user from participating in the creative decisions regarding the musical composition of the ringtone. Thus, there is a need for a highly customized ringtone service which allows the users the option of creating or fabricating customized ringtones.

BRIEF DESCRIPTION OF THE DRAWINGS

To further clarify at least some of advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for creating customized content including customized ringtones that can be played on a device such as a cellular telephone. Embodiments of the invention enable users to create a customized ringtone by mixing or manipulating together a user-created recording and a predefined template. As described more fully below, aspects of the invention are capable of encapsulating multiple effects that may be applied to a ringtone in a template paradigm, which allows a user to quickly and easily browse and select a plurality of complex audio effects that may be included in a customized ringtone. This process uses complex audio stream modifications and transformations of audio content using a user-friendly mobile application environment. Moreover, the user has the ability to preview and select tracks along with a variety of audio effects that are rendered together into a ringtone that is capable of being properly played on the user's device.

Figure 1:
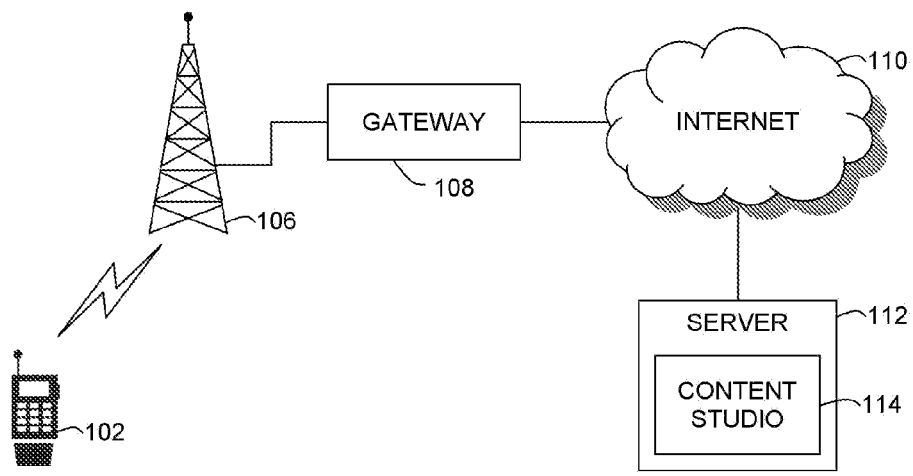
FIG. 1 illustrates an exemplary environment for implementing embodiments of the invention.

FIG. 1 illustrates an exemplary environment for implementing embodiments of the invention. FIG. 1 illustrates a device 102 which communicates with a remote server 112 to access a content studio 114. The content studio 114 enables a user of the device to generate content that can then be delivered to the device 102. The content generated by the content studio 114, for example, may include content from which a ringtone is selected and/or generated. Embodiments of the invention enable content in the content studio 114 to be customized with user-defined recordings sent from the device 102 sent to the server 112, mixed together by the server 112, and played by the device 102, for example as a ringtone.

In FIG. 1, the device 102 may be a cellular telephone, a personal digital assistant, a laptop computer, or any other device that can access the server 112 over a network. In this example, the device 102 is in wireless communication with a tower 106 that communicates to a gateway 108. The gateway 108 serves as a bridge between the protocols of the wireless network in which the device 102 operates and other networks such as the Internet 110. The gateway 108 thus converts a transmission in one domain to another or from one protocol to another.

In this example, the device 102 is transmitting over a wireless network using protocols that are common to cellular telephones. The gateway 108 receives the transmission from the device 102 and forwards the transmission over the Internet 110 to the server 112 using the appropriate Internet protocol. Similarly, the gateway 108 converts data transmitted over the Internet 110 from the server 112 into the appropriate wireless protocol for transmission to the device 102. In this example, the device 102 can request and receive content such as ringtones from the content studio 114 of the server 112.

As described more fully below, the content studio 114 includes, in one embodiment, computer executable modules or code that generate content for a user based on various factors or considerations. When generating a ringtone, for example, the content studio 114 may prompt a user for input for a template selection to be used in a ringtone. Alternatively, the content studio 114 may be able to identify which template the user would be most likely to prefer based on information already known or previously provided by the user. Thus, the user preferences may be inputted through a user interface, discovering by analyzing a user library, inferred from previous user selections, or may be stored in a database.

Figure 2:
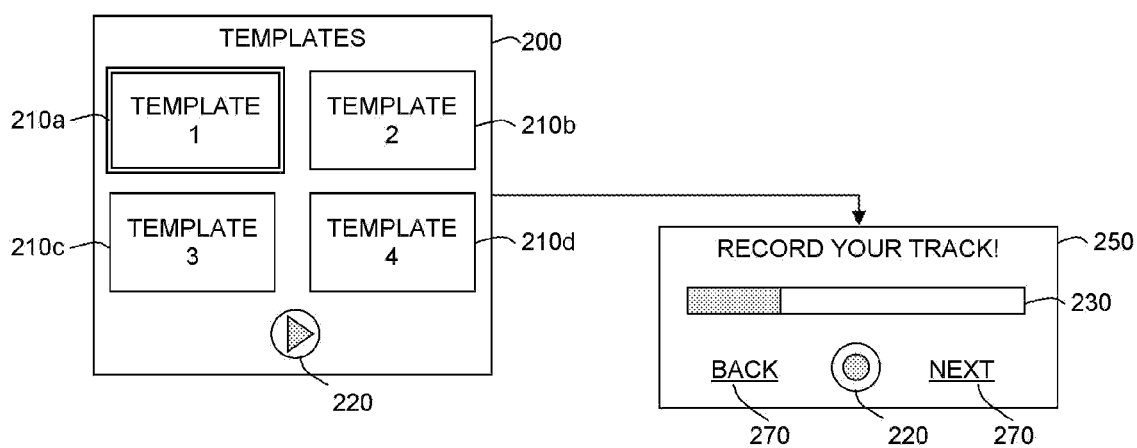
FIG. 2 illustrates an exemplary user interface which includes a listing of templates that a user may select for creating a customized ringtone along with a user interface for capturing a user recording to mix into the customized ringtone.

The various tracks or templates capable of being used in a mixed ringtone are stored within the content studio 114 or are accessible to the content studio 114. In the preferred embodiment, each template also includes or is associated with a description that describes the various characteristics of the template. FIG. 2, for example, illustrates an exemplary user interface 200 which includes a listing of various templates 210a-210d that are available for use in association with the present invention. In one embodiment of the present invention, each template 210a-210d may also include a description that describes the style, genre, or other characteristics of each template 210a-210d. In this example, the user also has an option to select a play button 220 whereby he or she may preview a selected template 210a.

Once the user has selected a template 210a that he or she would like to use to create their personalized track, the user is taken to a user interface 250 where he or she may record their own recording or track to be mixed into the selected template 210a. In one embodiment of the invention, each template 210a has an acceptable range of lengths of user recordings that may used in association with the template 210a in order to produce a successfully mixed ringtone. More specifically, each template 210a may be associated with a plurality of subtemplates, each of with has a predetermined length of time. Depending on the specific length of each of these subtemplates and how the subtemplates are joined together to generate the final template, a range of acceptable lengths of user recordings is generated.

As shown in FIG. 2, in one embodiment the user interface 250 includes a recording button 240 which the user may select to initiate the recording and a recording progress bar 230 whereby the user can see how much longer he or she has to record their recording. Alternatively, the progress bar 230 may show how long the user has been recording and the allowable length may or may not be limited. The user interface 250 shown in FIG. 2 also includes a next button 260 whereby the user can initiate the mixing process, and a back button 270 whereby the user may be returned to the template selection interface 200 wherein the user may select a different template 210a-210d.

Figure 3:
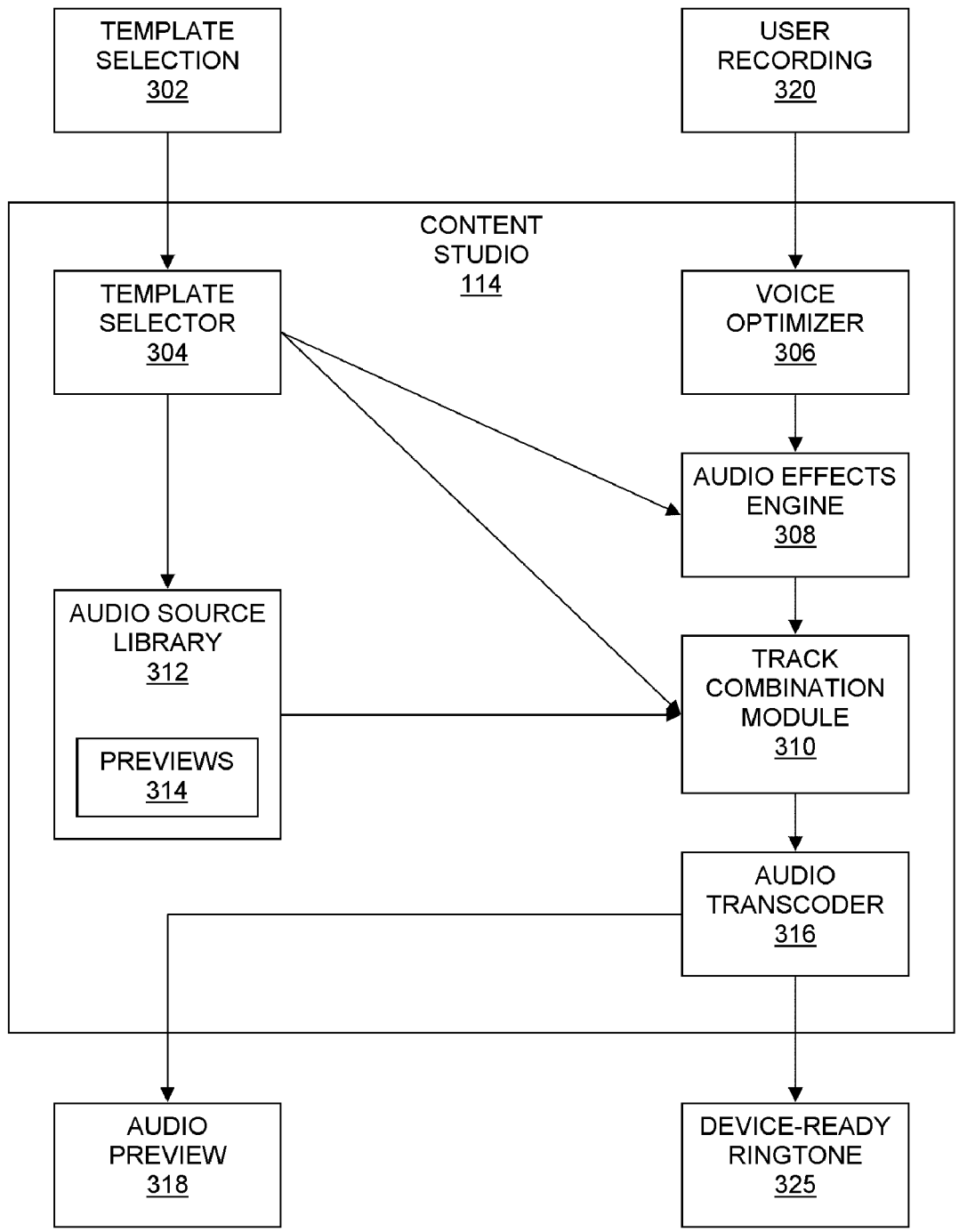
FIG. 3 illustrates an embodiment of a server that generates a mixed ringtone using a series of selections and user-defined audio recordings.

FIG. 3 illustrates a content studio 114 of a server 114 that generates and sends content such as a ringtone to a user. In FIG. 3, the content studio 114 includes an audio source library 312 that includes musical tracks which act as the templates 210a-210d into which a user's recorded track 320 may be mixed. When the server 112 receives a request to preview or create a ringtone, the user request is sent to the content studio 114 and includes a selected template 302 that the user wants to be used to create the ringtone.

During the initial template selection process, the content studio 114 of the server 112 may receive input from the user that indicates that that the user has selected a template selection from the template selector 304 for preview. The template selector 304 may then transfers a preview 314 of the preliminary selection to user. This process may include retrieving the relevant source content, mixing it according to the preliminary selection, and transcoding it at a reduced bit rate, or may comprise retrieving a series of prerendered previews 314 of the templates which have previously been generated and stored in the source library 312 prior to the user selection.

Once the user has finalized his or her selection, the template selector 304 receives the selected template and other user preferences 302 and sends corresponding requests to an audio effects engine 308, an audio source library 312, and a track combination module 310. More specifically, the template sector 304 receives the selections made by the user in the template selection 302 and sends a series of requests to other modules of the content studio 114 so that those modules can perform various editing, manipulating, and mixing processes according to the user's template selection 302.

For example, a user template selection 302 based on a "Star Wars Theme" may include creating a ringtone which applies a series of special effects on a user recording 320 and combines the altered user recording 320 with a series of "Star Wars" themed audio clips. For instance, the user template selection 302 may prompt the template selector 304 to instruct the audio effects engine 308 to apply a "Darth Vadar" effect to the user's voice in the user recording 320 and to send the resulting recording to a track combination module 310 where it may be combined with an audio clip of music from the audio source library 312 associated with "Darth Vadar." The combined track may then be sent to an audio transcoder 316, which may prepare an audio preview 318 of the track for the user to review prior to their committing to purchasing a device-ready version of the ringtone 325.

The content studio 114 also includes a voice optimizer 306 which may perform a series of operations on the user recording 320 prior to being sent to the audio effects engine 308 and track combination module 310. Once the recording 320 is received by the voice optimizer 306, the recording 320 may be analyzed for various purposes, including, but not limited to, determining the length of the recording, determining the format of the recording, the type of device used to capture the recording, and the like. In one embodiment of the invention, this information may be used to determine the compatibility of the user recording 320 and template selection 302, as well as determining what format ringtone would be compatible with the user device.

The user recording 320 may comprise any number of formats including QCELP (Qualcomm Code Excited Linear Prediction), GSM 6.10, or other forms of audio compression known in the art. Depending on the specific configuration of the voice optimizer 306, dynamic range adjustment may be performed on the recording and/or a frequency filter may be used in order to eliminate any external noise and/or to further clarify the user's voice in the user recording 320. Furthermore, the voice optimizer 306 may apply a "fade in" or a "fade out" effect to the beginning or end of the user recording 320. Finally, the voice optimizer 306 may eliminate any dead or quiet space in the message in order to clip the user recording 320 to an acceptable length.

As previously described, in one embodiment of the invention, the template selector 304 may have a plurality of different subtemplates which match the template selection 302 selected. More specifically, the template selector 304 may have a variety of different subtemplates which may be applied to various user recordings 320 of differing lengths. While the use of these subtemplates may be transparent to the user, it has the advantage of providing the system with more versatility since it may be more efficient to identify a suitable subtemplate which matches the length of the user recording 320 than to modify the length of the user recording 320 to a particular length.

As briefly described above, the track combination module 310 may be used to combine the user recording 320 with content from the audio source library 312. During this process, the track combination module 310 may apply background tracks to the user recording 320, as well as applying a "lead in" or "lead out" on the combined track, or performing other mixing techniques which are currently known in the art.

Then, depending on the specific template selected by the user 302, the combined track may then be sent again to the audio effects engine 308, so that a variety of effects may be applied on the track after it has been combined with content from the audio source library 312. Thus, the audio effects engine 308 may apply a series of effects on the mixed recording as a whole.

The content studio also includes an audio transcoder 316 which may be used to generate user previews 318 of the mixed ringtones as well as device-ready versions of the final ringtone 325. As previously described, once the user has determined that he or she wishes to receive the mixed the ringtone, the phone-ready ringtone 325 is delivered using a standard protocol such as mp3, true-tone format, or other standard protocol commonly used in the art. A user may also be provided with a link that can be selected to initiate download of the generated ringtone. Other protocols may also be used to deliver the content to the user's device, such as by email or by message. In many instances, the ringtone may be delivered in an MP3 or AAC format, meaning that the ringtone may be used both as a ringtone that may be played on a user's device, but also as a standard audio file that the user may send to other users or other devices for subsequent playback. Thus, one aspect of the present invention is a customizable ringtone that is capable of being used as a ringtone and as an audio file that is capable of subsequent playback by other users or on other devices.

In one embodiment, the transcoding process that is performed on the audio preview 318 is performed at a lower bit rate than is typically utilized in a ringtone transcoding system capable of delivering a phone-ready ringtone. Advantageously, this allows the server to quickly and efficiently generate a preview 318 that assists the user in finalizing his or her selection without requiring the server 112 to generate multiple high-quality ringtones.

Figure 4:
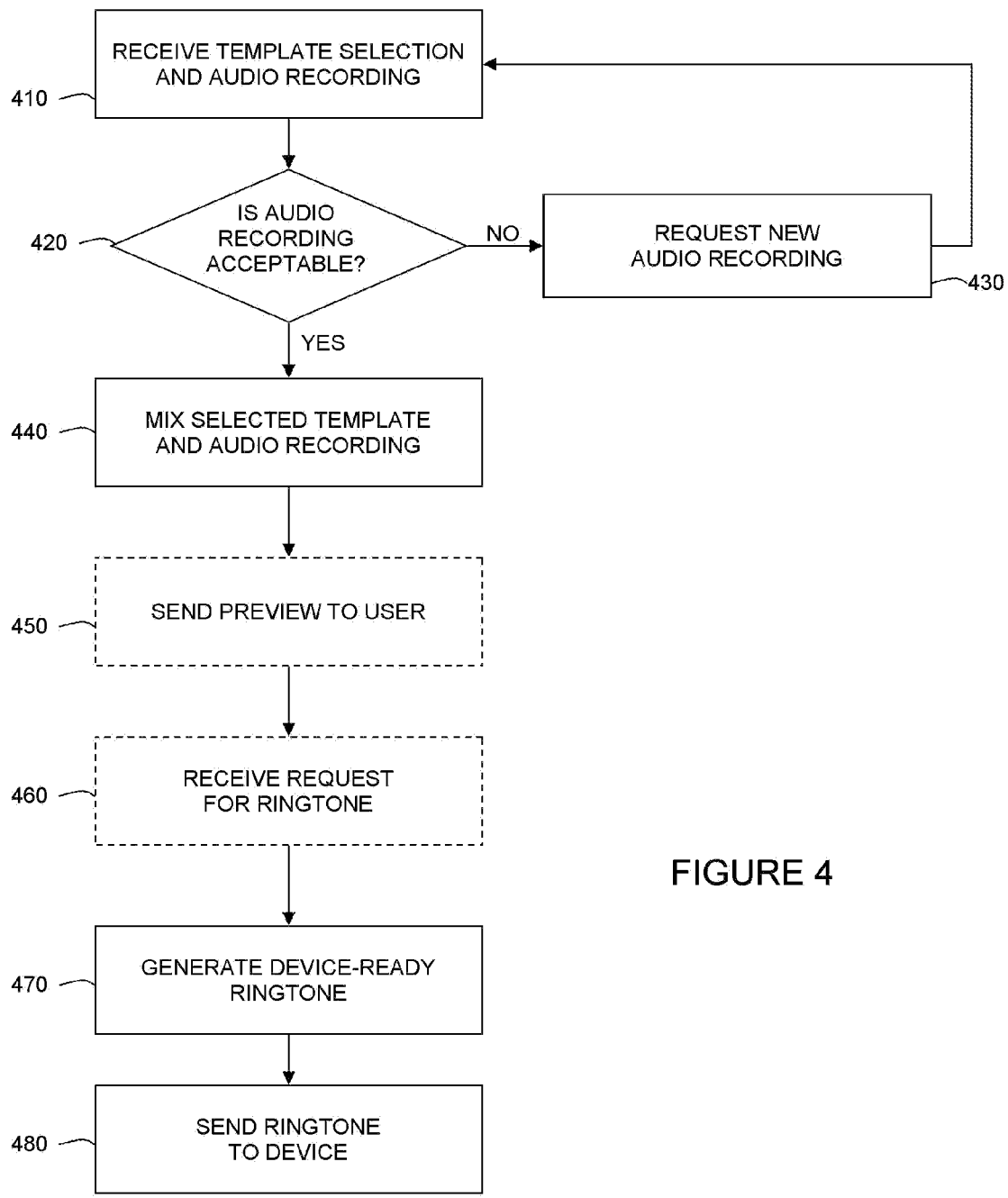
FIG. 4 illustrates an exemplary flow diagram for creating a mixed ringtone from a server's perspective.

FIG. 4 illustrates an exemplary method of creating a mixed ringtone using a device such as a cellular telephone. Through the device's user interface, the user makes a request for content for the device that includes a selected template that the user has selected from a list of templates from the server. Optionally, the user may elect to preview the templates included in the listing during the selection process.

Once the user has selected a template, the user is prompted to record a recording that may be sent to the server. In some instances, the user may preview the recording or rerecord a new recording if he or she is unsatisfied with their recording. the process begins at the server when the template selection and audio recording are received 410 by the server. After the server receives 410 the user recording, the server analyzes 420 the user recording to determine if the recording has an acceptable length, format, and the like. If the server determines that the recording is not acceptable, then the server sends 430 a request to the user for a new recording. If, however, at 420 the server determines that the recording is acceptable, then the server mixes 440 the template and recording into a single customized ringtone.

Then, the user may be sent 450 a preview of the ringtone generated according to the selected template and recording. After listening to the preview, the user may then send a request to the server for a device-ready version of the customized ringtone. Upon receiving 460 the user request, the server generates 470 a device-ready mixed ringtone according to the user input and transmits 480 the ringtone to the device.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for generating a mixed ringtone in a system comprised of a device and a server capable of communicating with the device, the server being associated with a computing device, the method comprising:
- providing one or more templates of exemplary mixed ringtones which the server and associated computing device are capable of generating to the device;
- receiving a template selection of a particular template from the device;
- requesting an audio recording of a user from the device;
- receiving the audio recording from the device;
- mixing the audio recording with a plurality of audio content associated with the particular template into a mixed ringtone; and
- sending the mixed ringtone to the device.

2. The method of claim 1, further comprising sending a preview of the mixed ringtone to the device.

3. The method of claim 1, further comprising optimizing the audio recording of the user prior to mixing the audio recording with the particular template.

4. The method of claim 3, wherein optimizing the audio recording of the user comprises applying a series of audio effects on the optimized audio recording prior to mixing the audio recording with the particular template, wherein the audio effects are associated with the template selection.

5. The method of claim 1, wherein mixing the audio recording comprises mixing the audio recording with a plurality of content associated with the particular template in order to form the mixed ringtone.

6. The method of claim 1, further comprising transcoding the mixed ringtone into a format capable of being played by the device.

7. A system for generating a mixed ringtone which includes a computing device which is connected to a user device, the system comprising:
- a server capable of sending and receiving communications with the user device;
- a track selector capable of providing a listing of one or more templates of exemplary mixed ringtones which the computing device is capable of generating to the user via the server, receiving a template selection of a particular template from the user device, and requesting an audio recording of a user from the user device;
- a voice optimizer capable of receiving the audio recording from the user device and preparing the audio recording for mixing;
- a track combination module which is capable of mixing the audio recording with a plurality of audio content associated with the particular template into a mixed ringtone; and
- an audio transcoder which is capable of transcoding the mixed ringtone into a predetermined format and sending the mixed ringtone to the user device via the server.

8. The system of claim 7, wherein the audio transcoder is further capable of sending a preview of the mixed ringtone to the user device.

9. The system of claim 7, wherein the voice optimizer prepares the audio recording for mixing by performing a series of operations on the audio recording to modify the length or properties of the audio recording.

10. The system of claim 7, further comprising an audio effects engine capable of performing a series of audio effects on the optimized audio recording prior to mixing the audio recording with the particular template, wherein the audio effects are associated with the template selection.

11. The system of claim 7, wherein mixing the audio recording comprises mixing the audio recording with a plurality of content associated with the particular template in order to form the mixed ringtone.

12. The system of claim 7, wherein the audio transcoder transcodes the mixed ringtone into a format capable of being played by the user device.

13. The system of claim 7, further comprising an audio source library comprising a database for storing the plurality of audio content associated with the particular template.

14. A method for generating a mixed ringtone in a system comprised of a server and an associated computing device using a user device which is capable of communicating with the computing device via the server, the method comprising:
- receiving a listing of one or more templates of exemplary mixed ringtones which the server and associated computing device are capable of generating at the user device;
- requesting a mixed ringtone according to a selected template using the user device;
- receiving a request for an audio recording to be included in the mixed ringtone;
- recording the requested audio recording using the user device;
- sending the requested audio recording to the server and associated computing device; and
- receiving a mixed ringtone from the server and associated computing device which includes the requested audio recording mixed with a plurality of audio content associated with the selected template.

15. The method of claim 14, further comprising receiving a preview of the mixed ringtone.

16. The method of claim 15, wherein the preview of the mixed ringtone is in a mp3 or true tone format.

17. The method of claim 16, wherein the preview of the mixed ringtone has a lower quality bit-rate than the mixed ringtone.

18. The method of claim 14, wherein receiving a listing of one or more templates of exemplary mixed ringtones comprises receiving a plurality of previews of the exemplary mixed ringtones.

19. The method of claim 14, wherein the mixed ringtone is received in a format capable of being played by the user device.

20. The method of claim 14, wherein the audio recording of the mixed ringtone received from the server also includes a series of audio effects performed on the audio recording, wherein the audio effects are associated with the template selection.

* * * * *